(12) United States Patent
Streete et al.

(10) Patent No.: US 10,949,441 B1
(45) Date of Patent: Mar. 16, 2021

(54) DATA CENTER INFORMATION RETRIEVAL SYSTEM AND METHOD OF OPERATING THE SAME

(71) Applicant: VCE IP Holding Company LLC, Richardson, TX (US)

(72) Inventors: Jonathan Streete, San Jose, CA (US); Rajesh Nandyalam, Shrewsbury, MA (US); Geoffrey Bourne, Allen, TX (US); Venkatesh Madhipatla, Westford, MA (US)

(73) Assignee: EMC IP Holding Company LLC, Round Rock, TX (US)

( * ) Notice: Subject to any disclaimer, the term of this patent is extended or adjusted under 35 U.S.C. 154(b) by 265 days.

(21) Appl. No.: 15/499,162

(22) Filed: Apr. 27, 2017

(51) Int. Cl.
*G06F 16/25* (2019.01)
*H04L 29/08* (2006.01)
*G06F 16/22* (2019.01)

(52) U.S. Cl.
CPC ........... *G06F 16/258* (2019.01); *G06F 16/22* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,640,179 B1* | 12/2009 | Sachedina | ............. | G06Q 10/06 705/7.31 |
| 2004/0196740 A1* | 10/2004 | Sachedina | ............. | G06Q 10/06 368/46 |
| 2005/0278646 A1* | 12/2005 | Liscano | ................. | H04L 69/08 715/762 |
| 2006/0213978 A1* | 9/2006 | Geller | .................... | G06Q 20/10 235/380 |
| 2006/0213979 A1* | 9/2006 | Geller | ................ | G06Q 20/403 235/380 |
| 2006/0213980 A1* | 9/2006 | Geller | .................... | G06Q 20/10 235/380 |
| 2018/0101647 A1* | 4/2018 | Lloyd | ................... | G06F 16/258 |
| 2018/0260258 A1* | 9/2018 | Wester | ................ | G06F 16/258 |

* cited by examiner

*Primary Examiner* — Kim T Nguyen
(74) *Attorney, Agent, or Firm* — Polsinelli PC

(57) ABSTRACT

A data center information retrieval system includes a computer-executed device information retrieval application in communication with first and second devices configured in a data center. Each device includes one or more elements that provide a service for the data center. The application obtains and stores one or more first element records associated with one or more of the elements of the first device in a database, and communicates with a modular software component to obtain information associated with the corresponding one or more second elements of the second device, the modular software component translating information obtained about the second elements to a format similar to that of the first element records.

20 Claims, 7 Drawing Sheets

DATA CENTER INFORMATION RETRIEVAL SYSTEM AND METHOD OF OPERATING THE SAME

TECHNICAL FIELD

Aspects of the present disclosure relate to computing devices and, in particular, to a data center information retrieval system and method of operating the same.

BACKGROUND

Data centers typically include facilities, such as buildings, that are used to house computer systems that can be collectively referred to as cloud computing environments. Cloud computing environments have been developed to provide services over a network, such as the Internet, in a manner that does not necessarily require intimate knowledge of logistical concerns as to how those services are provided. That is, due to resources being remote and remotely managed, often in a dedicated computing environment, users of the resources of a cloud computing environment may be alleviated from many logistical concerns, such as access to electrical power, failover events, reliability, availability, and the like. Additionally, resources provided by cloud computing environments may be relatively efficient due to their ability to share computing resources across multiple users (e.g., tenants), while delegating software development and maintenance costs to administrators of the cloud computing environment.

SUMMARY

According to one aspect of the present disclosure, a data center information retrieval system includes a computer-executed device information retrieval application in communication with first and second devices configured in a data center. Each device includes one or more elements that provide a service for the data center. The application obtains and stores one or more first element records associated with one or more of the elements of the first device in a database, and communicates with a modular software component to obtain information associated with the corresponding one or more second elements of the second device, the modular software component translating information obtained about the second elements to a format similar to that of the first element records.

BRIEF DESCRIPTION OF THE DRAWINGS

The various features and advantages of the technology of the present disclosure will be apparent from the following description of particular embodiments of those technologies, as illustrated in the accompanying drawings. In the drawings the like reference characters may refer to the same parts throughout the different views. The drawings depict only typical embodiments of the present disclosure and, therefore, are not to be considered limiting in scope.

DETAILED DESCRIPTION

Figure 1:
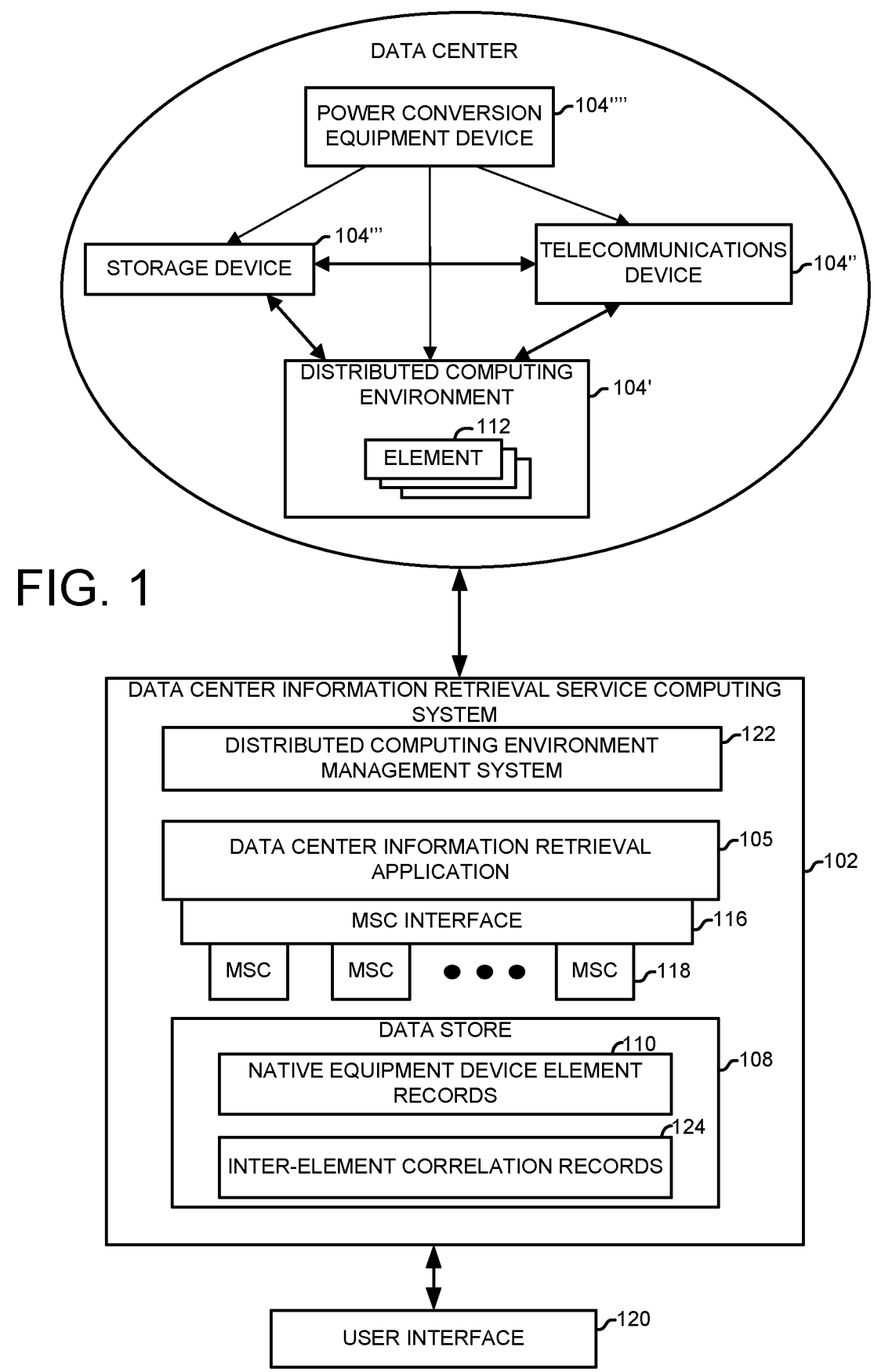
FIG. 1 illustrates an example data center management system according to the teachings of the present disclosure.

Embodiments of the present disclosure provide a data center management system and method for managing the operation of multiple devices, such as those devices configured in a data center. Whereas conventional management systems for devices typically deployed in a data center are dedicated to managing only one or several types of equipment, they often lack the ability to manage and/or communicate effectively with other types of devices, despite the devices relatively high level of inter-dependence upon one another. Embodiments of the present disclosure provides a solution to this problem among others, by providing a data center management system with an interface that can be configured with one or more modular software components (MSCs) that are used to communicate with other disparate devices, and translate information retrieved from and directive transmitted to those devices so that those disparate devices may be effectively managed from a single management system.

Data centers typically involve the use of multiple computer devices that are deployed to achieve an overall goal (e.g., data processing services for one or more entities, such as corporations and/or universities, or telecommunication services). The devices deployed in data centers often vary widely in purpose and design. For example, a typical data center may include distributed computing environments, such as dynamic infrastructures, for providing data processing services, telecommunications systems for providing communication services, storage systems for providing storage capacity to data processed by the distributed computing environments, and power conversion system for supplying the electrical power needs of those devices. Nevertheless, due to their disparate nature, these devices are typically provided by different manufacturers. Further, the management systems used to communicate with and manage these devices are often dedicated to their own devices. That is, conventional management systems used to manage individual devices typically deployed in a data center have not heretofore been readily adapted for communicating with and managing the operation of other devices typically deployed in a data center.

Distributed computing environments, which are also commonly referred to as unified computing systems, fabric-based computing systems, dynamic infrastructures, and converged infrastructures, have enjoyed increased use in data center implementations. These distributed computing environments have provided an efficient platform for the execution of relatively large and complex applications and/or services requiring a relatively high level of availability and performance. For example, an application or service may be deployed on a distributed computing environment by allocating multiple elements of the distributed computing environment to handle its workload without substantial regard to how those elements are managed and/or maintained. Additionally, the distributed computing environment may provide a relatively high level of availability for deployed applications or services by automatically migrating the use of certain components to other resources when those components fail. Nevertheless, this flexible deployment of elements often causes an undue burden when those elements may be dispersed throughout the distributed computing environment and may change or be migrated to other locations on a relatively frequent basis. In such cases, a logical grouping of certain elements may be desired from which actions (e.g., configuration changes, allocation of new services, de-allocation of existing services, maintenance, etc.) may be performed. But currently available data store management systems that would otherwise provide this service are limited in their ability to effectively provide groupings of those elements from which efficient management may be performed.

FIG. 1 illustrates an example data center management system 100 according to the teachings of the present disclosure. The system 100 includes a data center information retrieval application computing system 102 in communication with one or more devices 104 of a data center 106. The system 102 has a data center information retrieval application 105 and a data store 108 that stores native device element records 110 associated with the elements 112 of a first native device 104, which in this particular example, is a distributed computing environment device 104'. As will be described in detail herein below, the data center information retrieval application 105 may communicate with one or more modular software components (MSCs) 114 to store element records 110 associated with the elements 112 of other devices 104 configured in the data center 106.

In general, the data center information retrieval application 105 manages a data store 108 that includes element records 110 associated with the elements 112 in a first device 104, and may include an interface 116 for communicating with one or more MSCs 118 having the necessary business logic for communicating with other disparate types of devices 104 in the data center 106. For example, a provider of one device 104 may also provide the application 105, which natively possesses the necessary business logic for managing the operation of its respective devices 104. However, because the business logic necessary for communicating with the other devices 104 in a typical data center implementation may not be readily available, the application 105 is provided with an interface 116 that allows the providers of the other devices 104 to supply their own MSCs 118 that can be readily coupled to the application 105. Thus, differing types of devices 104 having disparate management schemes may be efficiently combined into a single application 105 so that the inherently disparate devices 104 may be managed from a single user interface 116.

The data center 106 may comprise any type and quantity of devices 104 that vary widely in purpose and design. For example, a typical data center may include a distributed computing environment device 104', such as a dynamic infrastructure, for providing data processing services, a telecommunications device 104" that provides communication services internally with other devices 104 in the data center 106, and/or with other devices external to the data center 106. The data center 106 may also include a storage system device 104'" to provide enhanced storage capacity for the data processed by the distributed computing environment device 104'. The data center 106 may also include a power conversion system device 104 for supplying the electrical power needs for the distributed computing environment device 104', the telecommunications device 104", and/or the storage system device 104'".

The application 105 exposes the interface 116 for enabling communication between the application 105 and a MSC 118. The interface 116 may include any suitable type of architecture, such as an application program interface (API) that can associate certain hooks or handles between the application 105 and the MSCs 118. In one embodiment, the MSCs may be configured as plug-ins, add-ons, extensions, and the like, that may be deployed independently of the application 105 and/or independently of each other. The MSCs 118 as described herein generally refer to specified segments of software code that may be added to or deleted from the application 105 on an as-needed basis. For example, an administrator may desire to obtain information about power usage incurred by certain elements 112 of a distributed computing environment device 104. However, most conventional information retrieval systems for distributed computing environment devices 104' often do not natively provide power usage information. Thus, an application 105, which is natively adapted to communicate with the distributed computing environment device 104', may be configured with a MSC 118 obtained from a provider of the power conversion system device 104"" used to provide electrical power to the distributed computing environment device 104' so that power usage information for certain components of the distributed computing environment device 104"" may be easily obtained.

The element records 110 may be continually updated by the data center information retrieval application 105, such as via the use of a discovery process performed at regular intervals, to maintain the element records 110 in an up-to-date state relative to the characteristics and operational conditions of the elements 112 that they represent. Additionally, the data center information retrieval application 105 may also augment the element records 110 to include information obtained from other devices 104 using inter-element correlation records 124 that store information about associations among the elements of different devices 104.

In one embodiment, the data store 108 comprises a NoSQL-type data storage system in which records, commonly referred to as documents, may be generated and stored therein without any specified schema. For example, the NoSQL-type data store may be administered by a NoSQL data center information retrieval service that generates a document that is void of any particular schema typically associated with the records of a data store, and provides for access to each document using standard search notation, such as alpha-numeric search phrases and/or other criteria that may be used to access various forms of information about the documents stored in the data store. In a particular example, the NoSQL data store utilizes an Elasticsearch™ data center information retrieval service, which is released under an open source license from the Apache Software Foundation in Forest Hill, Md.

The Elasticsearch™ data center information retrieval service stores information about each element 112 as a Javascript object notation (JSON) document (e.g., an element record 110) in the data store 108 in a manner that does not require any particular schema. Thus, the schema of the newly added element record 110 does not need to be integrated with the schema of existing element records 110 in the data store 108. Additionally, the Elasticsearch™ data center information retrieval application 105 may function as a multi-tenant data center information retrieval service to effectively manage its use by multiple users, and has a RESTful interface for efficient operation across a network, such as a proprietary communication network of the distributed computing environment, or a publicly available network, such as the Internet.

The data center information retrieval application 105 may communicate directly with the elements 112 in the distributed computing environment 114 to receive their information, or it may communicate with the elements 112 through an intermediary mechanism, such as a distributed computing environment management system 122. The distributed computing environment management system 122 may be any type, such as one that manages the operation of the elements 112 of the distributed computing environment 114, which may include, for example, provisioning elements, de-provisioning elements, configuring one or more operational parameters on each element 112, and the like. Any suitable type of distributed computing environment management system 122 may be implemented with the teachings of the present disclosure. In one embodiment, the distributed computing environment management system 122 includes a vSphere™ software suite that is available from VMware Corporation, which is headquartered in Palo Alto, Calif.

The elements 112 may be provided by one or more pieces of equipment configured in the distributed computing environment 114. In most cases, the elements 112 generally refer to computing devices that perform some function for the overall operation of the distributed computing environment 114. Examples of such computing devices may include, for example, laptop or notebook computers, workstations, tablet computers, and the like, or even may include complex computing structures, such as clusters, unified computing systems, fabric-based computing systems, and dynamic infrastructures. The elements 112 may also include other communication devices, such as switches, routers, firewall appliances, or other communication device that facilitates communication among multiple elements in other devices 104.

The data center information retrieval service computing system 102 and the devices 104 of the data center 106 may communicate with one another through a communications network. Nevertheless, the data center information retrieval service computing system 102 and the devices 104 may communicate with one another in any suitable manner. For example, the data center information retrieval service computing system 102 and the devices 104 may communicate with each other using wireless and/or wired communications. In one embodiment, the data center information retrieval service computing system 102 and the devices 104 communicates with one another using a communication network, such as the Internet, an intranet, or another wired and/or wireless communication network. In another embodiment, the data center information retrieval service computing system 102 and the devices 104 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the data center information retrieval service computing system 102 and the devices 104 may communicate with one another without the use of a separate and a distinct network.

Figure 2A:
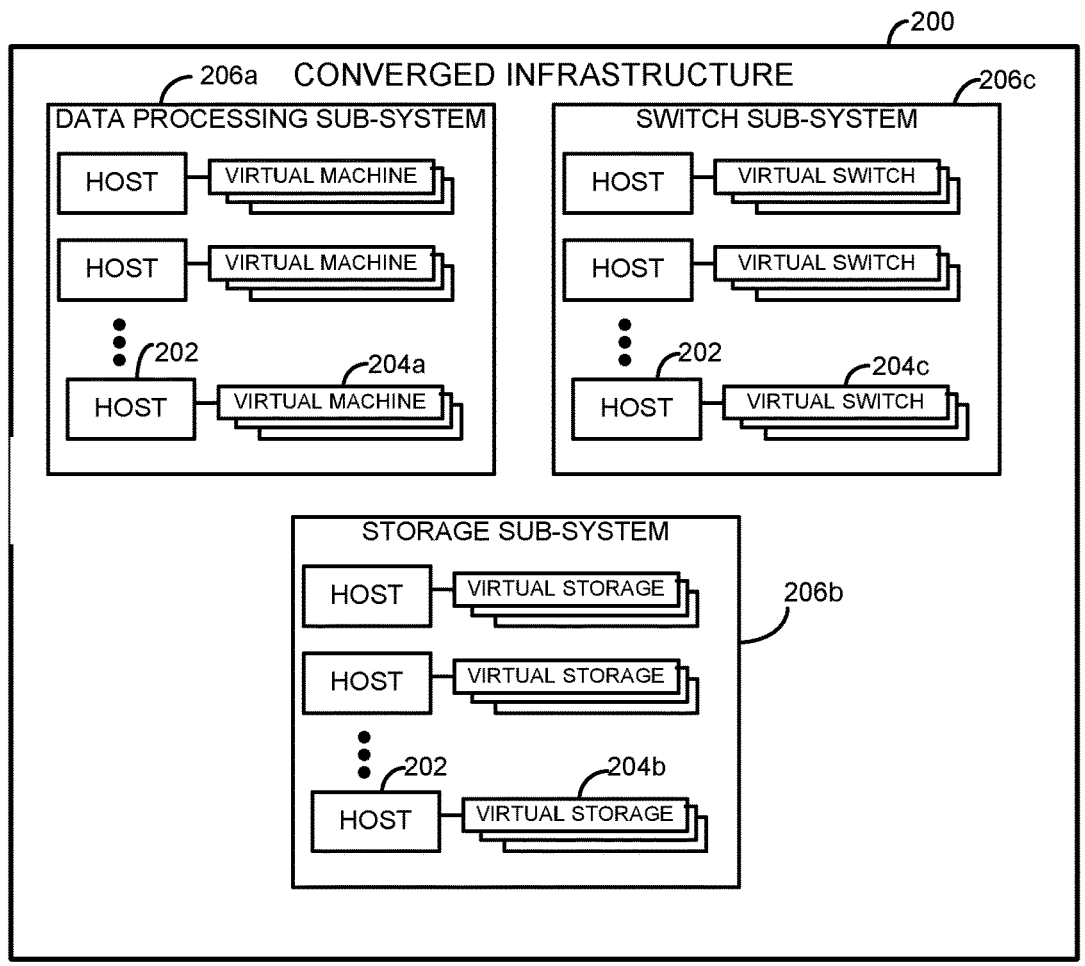
FIGS. 2A and 2B illustrate an example converged infrastructure that may be implemented as a computing node of the distributed computing environment according to one embodiment of the present disclosure.
Figure 2B:
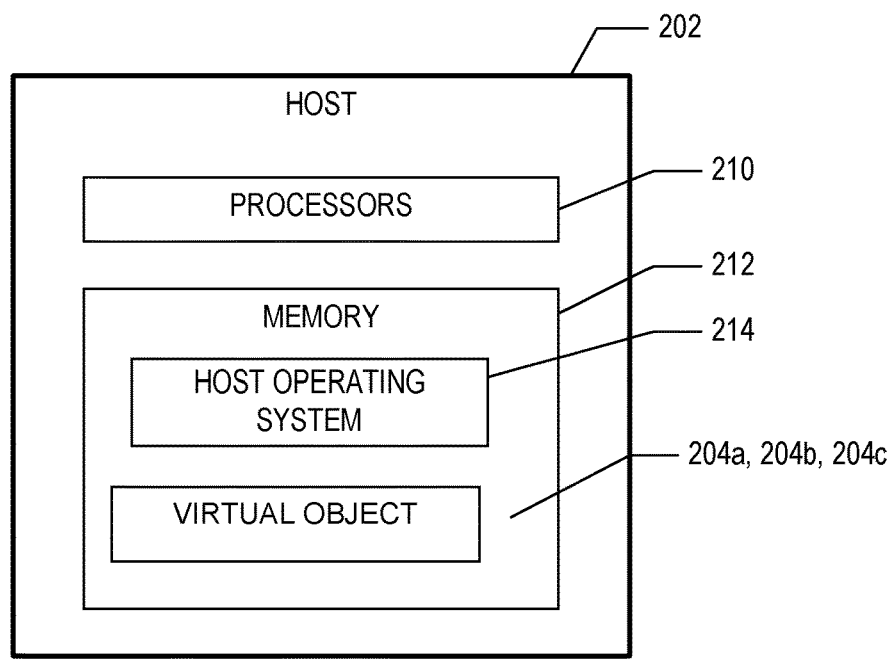

FIGS. 2A and 2B illustrate an example converged infrastructure 200 that may be implemented as a distributed computing environment 104' according to the teachings of the present disclosure. For example, multiple converged infrastructures 200 as described herein may be configured to communicate with one another using a communication network, such as the communication network 126 to form at least a portion of the distributed computing environment 114.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from DELL/EMC, LLC, which is located in Hopkinton, Mass.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware Corporation, which is located in Palo Alto, Calif.

FIG. 2B illustrates an example host 202 implemented on each converged infrastructure 200 according to one aspect of the data center management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
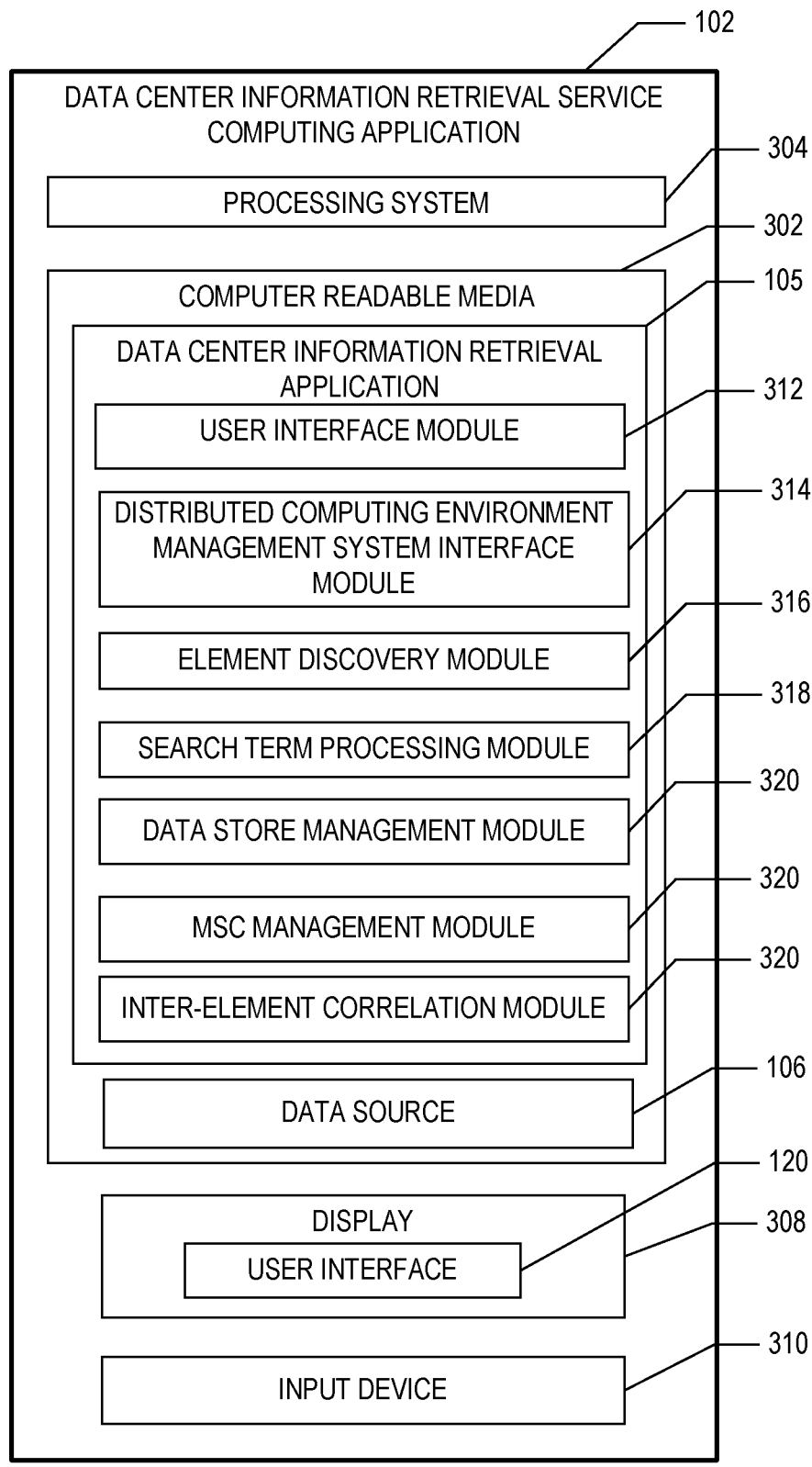
FIG. 3 illustrates a block diagram of an example data center information retrieval application executed on the data center information retrieval application computing system according to one embodiment of the present disclosure.

Referring now in more detail to FIG. 3, a block diagram of an example data center information retrieval application 105 executed on the data center information retrieval service computing system 102, is depicted according to one aspect of the present disclosure. The data center information retrieval application 105 is stored in a computer readable media 302 and executed on a processing system 304 of the computing system 102. The computing system 102 may include any type of computing system, such as one or more management computing systems, personal computers, mobile computers and/or other mobile devices, and other hosts.

According to one aspect, the data center information retrieval service computing system 102 also provides the user interface 120, such as a graphical user interface (GUI) or a command line interface (CLI), which may be displayed on a display 308, such as a computer monitor, for displaying data. The data center information retrieval service computing system 102 also includes an input device 310, such as a keyboard or a pointing device (e.g., a mouse, trackball, pen, or touch screen) to enter data into or interact with the user interface 120. According to one aspect, the data center information retrieval application 105 includes instructions or modules that are executable by the processing system 304 as will be described in detail herein below.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 generates the user interface 120 to facilitate receipt of input data and/or output data from or to a user. The user interface module 312 may display information to, and receive user information, such as the user-defined data, from the user in any suitable form, such as via a graphical user interface (GUI) or a command line interface (CLI). In one embodiment, the user interface module 312 may display one or more entry fields for receiving a search term from the user, one or more element records 110 matching the search term, and/or any user-defined data entered by the user. Nevertheless, other embodiments contemplate that the user interface module 312 may display any type and number of input fields for receiving user input and displaying responses to the user input. For example, the user interface module 312 may display multiple entry fields to receive multiple search terms from the user along with one or more other entry fields for receiving user input on how the fields are to be combined, such as using one or more Boolean operators.

A distributed computing environment management system interface module 314 provides an interface to the distributed computing environment management system 122 for transmitting and receiving information about the distributed computing environment 114, and/or other information associated with operation of the system. For example, the distributed computing environment management system interface module 314 may communicate with the distributed computing environment management system 122 to receive information about each element 112 in the distributed computing environment 114 to be used for generating the element records 110 that are stored in the data store 108. The information may include identification information that may be used to query the element directly to receive parametric information that is stored in the element records, or alternatively; the information may include some, most, or all parametric information that is used to store in the element record.

An element discovery module 316 performs a discovery process to obtain information associated with each element 112 in the distributed computing environment 114 and store the obtained element information element records 110 in the data store 108. For example, the element discovery module 314 may communicate with one or more element managers configured on each device 104 to obtain the element information. Examples of element managers that may be implemented with embodiments of the present disclosure include a Cisco Unified Computing System (UCS) manager provided by Cisco Systems, Inc., of San Jose, Calif., and a VMware Virtual Center provided by VMware Corporation, of Palo Alto, Calif. For another example, the element discovery module 314 may communicate directly with each element 112, such as by issuing broadcast messages requesting that each element 112 respond with identifying information indicating their presence, type, and/or any related parametric information.

In one embodiment, the element discovery module 314 may perform the discovery process on an ongoing, periodic basis so that the element records 110 may be maintained in a relatively well-managed, up-to-date condition. For example, the element discovery module 314 may poll one or more element managers to determine whether any elements 112 have been added, deleted, and/or modified, and if so, perform a discovery process with those elements 112 to update their information in the element records 110. As another example, the element managers may be configured to automatically notify the element discovery module 314 whenever an element 112 is added, deleted, and/or modified such that the element discovery module 314 is triggered to perform a discovery process on those elements 112.

An search term processing module 318 performs searches for certain element records 110 using one or more search criteria obtained from the user interface module 312. For example, upon receipt of one or more search terms from the user interface module 312, the search term processing module 318 may query the data store 108 to obtain those element records 110 that include data matching the search terms.

Thereafter, the search term processing module 318 may communicate with the user interface 120 to display matched element records 110 on the user interface 120. In one embodiment, the element search processing module 318 communicates with a commercial-off-the-shelf (COTS) data center information retrieval service to query the data store 108, and receive response to those queries. In other embodiments, the search term processing module 318 may communicate directly with the data store 108 to manage the element records 110 and/or receive element records 110.

A data store management module 320 manages various functions of the data store 108, such as formatting information about each element to generate the element records 110 that are stored in the data store 108, updating information in each element record 110, deleting obsolete element records 110, and the like. In one embodiment, the data store management module 320 includes an ElasticSearch™ data center information retrieval service that creates and manages element records 110 using a schema-free JSON format, and has a RESTful interface for communication over a network. Nevertheless, the data store management module 320 may utilize any suitable type of data center information retrieval service without departing from the spirit and scope of the present disclosure.

In one embodiment, the data store management module 320 augments element records 110 with information obtained from the elements of other devices 104. For example, the data store management module 320 may communicate with a non-native equipment module 104 (e.g., an equipment module not natively supported by the application 105) using a MSC 118, and effectively combine the information with the element record 110 to provide enhanced information for the user's consumption. The module 320 may structure the obtained information according to a specified format (e.g., a JSON document structure), and expands a selected element record 110 to include the formatted user-defined data 116.

Herein below is shown an example of the a single-result document structure that may be received by the element discovery module 316 upon initial discovery:

```
{
   "results": [
      {
         "elementType": "Port",
         "attributes": {
            "status": "up",
            "configured": "false",
            "Host": "atlanta.lcd.east",
            "lastStatusChange": "2015-07-06T18:20:07.595Z",
            "name": "Port-5",
            "uid": "192,168.1.139"
         },
         "attachments": { }
      }
   ]
}
```

Then the data store management module 320 may receive information from a power conversion system equipment module 104"" to obtain a current power usage level for the port to augment the element record 110 for generating an example structure along with a timestamp, such as:
```
{
   "power usage": {
      "timestamp": "2015-07-06T20:15:00.000Z",
      "power==56.4 watts"
   }
}
```

And the resulting, combined, searchable document content would be:

```
{
   "results": [
      {
         "elementType": "Port",
         "attributes": {
            "status": "up",
            "configured": "false",
            "ost": "atlanta.lcd.east",
            "lastStatusChange": "2015-07-06T18:20:07.595Z",
            "name": "Port-5",
            "uid": "192.168.1.139"
         }
         "attachments": {
            "power": {
               "timestamp": "2015-07-06T20:15:00.000Z",
               "power == 56.4 watts"
            }
         }
      }
   ]
}
```

It should be appreciated that the modules described herein are provided only as examples, and that the data center information retrieval application 105 may have different modules, additional modules, or fewer modules than those described herein. For example, one or more modules as described in FIG. 3 may be combined into a single module. As another example, certain modules described herein may be encoded on, and executed on other computing devices, such as on one of the hosts 202 of a converged infrastructure 200 as described above with reference to FIGS. 2A and 2B.

Figure 4A:
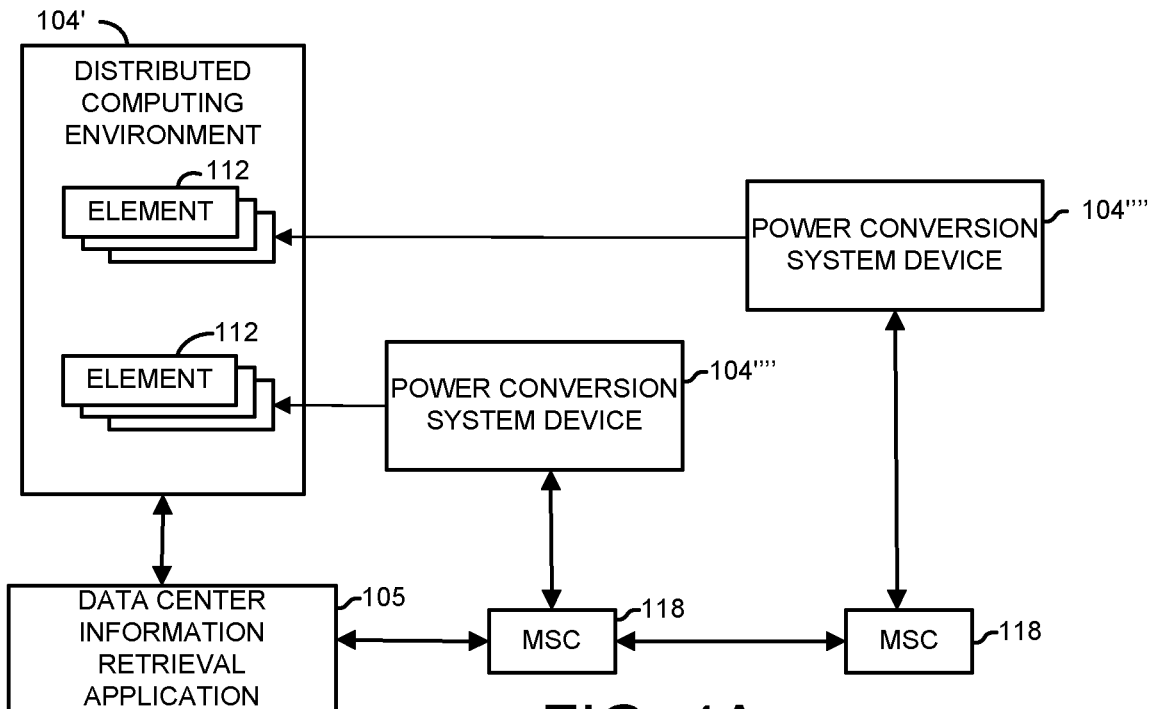
FIGS. 4A through 4C illustrate several example embodiments of the data center information retrieval application that may be used to coordinate information obtained from multiple, disparate devices configured in a data center.
Figure 4B:
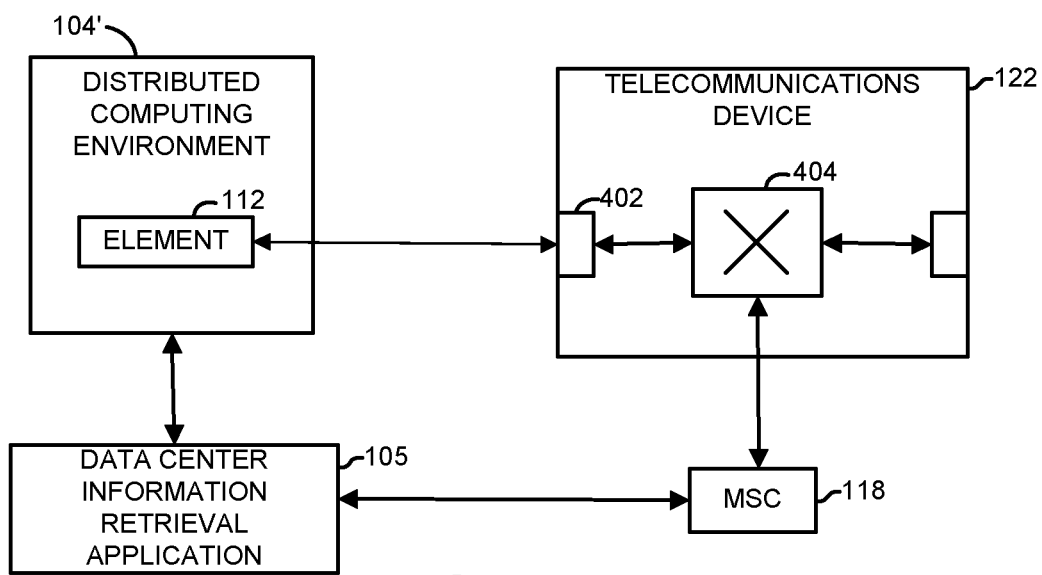
Figure 4C:
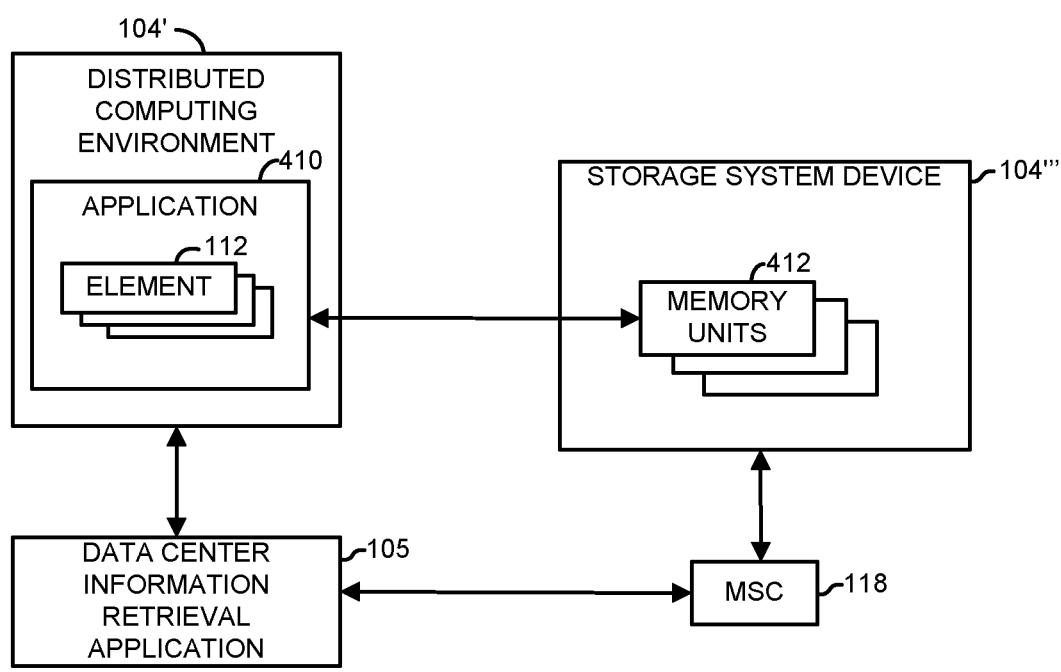

FIGS. 4A through 4C illustrate several example embodiments of the data center information retrieval application 105 that may be used to coordinate information obtained from multiple, disparate devices 104 configured in a data center. In general, FIG. 4A shows how information obtained from a power conversion system device 104"" may be coordinated with information from a distributed computing environment device 104', FIG. 4B shows how information obtained from a telecommunication device 122" may be coordinated with information from a distributed computing environment device 104', and FIG. 4C shows how information obtained from a storage system device 104'" may be coordinated with information from a distributed computing environment device 104'. Although only embodiments showing coordination between a distributed computing environment device 104', a power conversion device 104"", a telecommunication device 104", and a storage system device 104'" are described herein, it should be understood that the application 105 may be configured to communicate and combine information from any type of device that may exist in a data center.

Referring initially to FIG. 4A, distributed computing environment device 104' includes two sets of elements 112 in which each may be, for example, a blade array, a storage bank, or other configuration. Each set of elements 112 obtain electrical power from separate power conversion system devices 104"". In some cases, it would be beneficial to know how much electrical power each set of elements 112 are using. However, typical distributed computing environment device 104' implementations often do not provide this information. Typical power conversion devices 104"" do provide power usage information, but it has heretofore been difficult to correlate power usage information obtained from a power conversion device 104'''' with specific elements in an independently functioning distributed computing environment device 104'. The application 105 provides a solution to this problem by communicating with MSCs 118 that obtain power usage information from each MSC 118, correlates the obtained information with the specific set of elements 112 that is receiving electrical power, and provides the correlated information for consumption by a user.

FIG. 4B shows how information obtained from a telecommunication device 104'' may be coordinated with information from a distributed computing environment device 104'. As shown, distributed computing environment device 104' includes an element 112 that is communicatively coupled to a port 402 of a telecommunication device 104'', such as router, a cross-connect, add drop multiplier, or other type of telecommunication device. For example, the port 402 may form a portion of a communication link 404 or channel to a remotely configured element 112 internal to the data center or external from the data center. In many cases, it would be beneficial to know characteristic information about the connection, such as quality of service (QoS), bit error rate (BER), or other communication-based parametric information that may affect how the element 112 performs. But typical distributed computing environment device 104' implementations may not provide such information. Telecommunication devices often do provide this information, but due to the relatively large quantities of communication links provided by a typical telecommunication device, it has traditionally been difficult to correlate specific communication links with specific elements that use those telecommunication links. The application 105 provides a solution to this problem by communicating with a MSC 118 to obtain characteristic information about the communication link 404, correlating the characteristic information with a specific element 112 in the distributed computing environment device 104', and providing the correlated information for consumption by a user.

FIG. 4C shows how information obtained from a storage device 104''' may be coordinated with information from a distributed computing environment device 104'. As shown, distributed computing environment device 104' includes a set of elements 112 that are used to execute a distributed application 410. To provide additional storage capacity for the application 410, one or more memory units 412 are allocated for use from a storage system device 104'''. In many cases, it would be beneficial to know, from a distributed computing environment device management interface, characteristic information about the memory units 412, such as type of storage configuration (e.g., unified storage, RAID scheme, virtualized storage, current capacity level, nominal access time, etc.). However, due to the relatively large quantities of storage configurations provided by a typical storage system device, it has traditionally been difficult to correlate specific storage configurations with specific applications 410 administered by a distributed computing environment device management interface. The application 105 provides a solution to this problem by communicating with a MSC 118 to obtain characteristic information about the storage configuration of the memory units 412, correlating the storage configuration information with the specific application 410 in the distributed computing environment device 104', and providing the correlated information for consumption by a user.

Although FIGS. 4A through 4C illustrate example embodiments showing how information from multiple disparate devices configured in a data center may be correlated into useful information for a user, other embodiments contemplate that the application 105 may display additional, fewer, or different configurations that what was described herein without departing from the spirit and scope of the present disclosure. For example, a typical data center implementation of a distributed computing environment device 104' may, and often does, receive electrical power from more than two power conversion devices 104. As another example, the data center information retrieval application 105 may communicate with other types of devices that may be implemented in a data center not explicitly shown or described herein.

Figure 5:
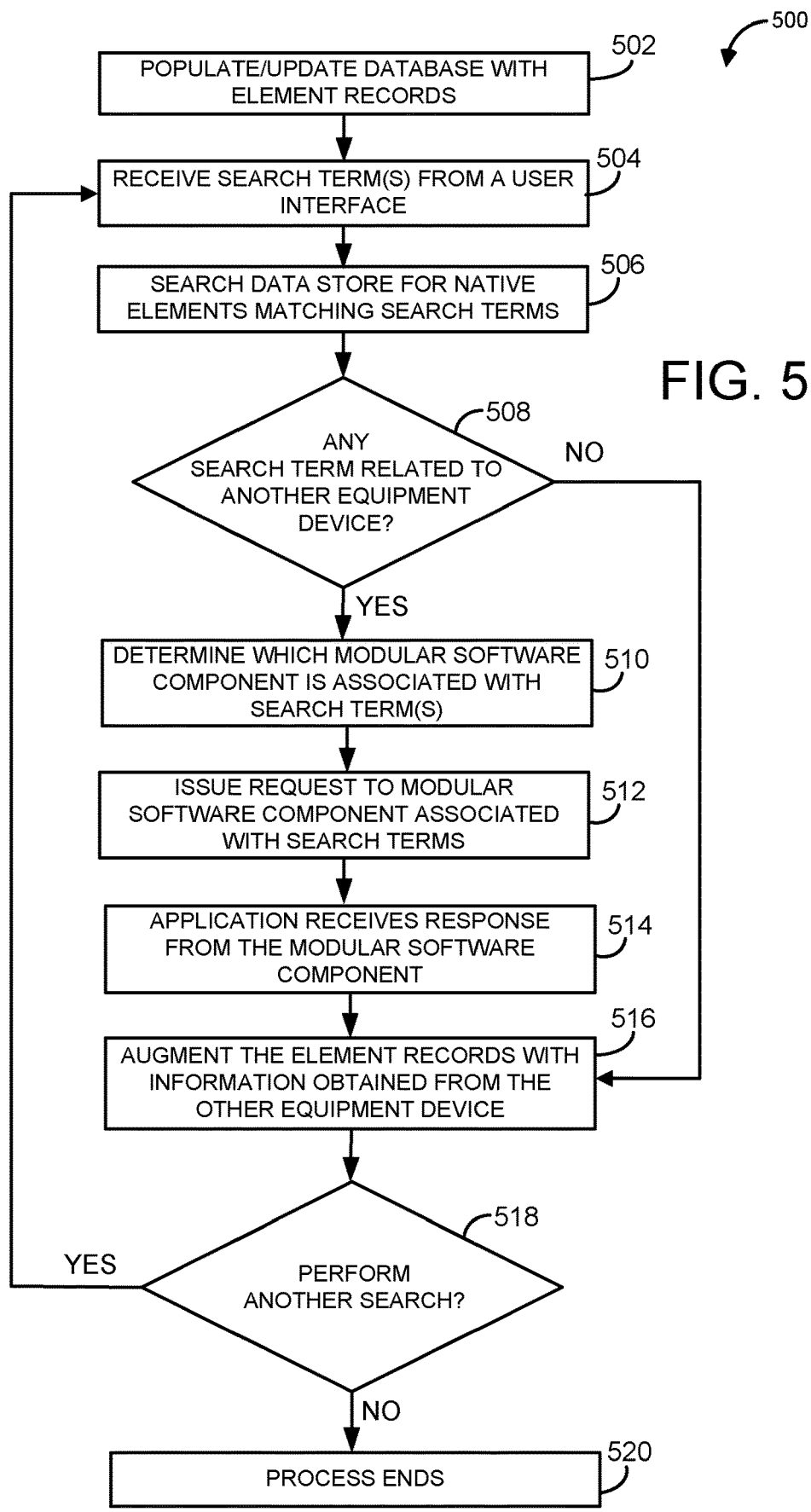
FIG. 5 illustrates an example process that is performed by the data center information retrieval application for receiving input from a user interface for obtaining information from multiple, disparate devices and displaying the information for consumption by a user according to one embodiment of the present disclosure.

FIG. 5 illustrates an example process 500 that is performed by the data center information retrieval application 105 for receiving input from a user interface for obtaining information from multiple, disparate devices 104 and displaying the information for consumption by a user according to one embodiment of the present disclosure. Initially, one or more MSCs 118 may be configured with the application 105. For example, the user of a first device 104 may receive a MSC 118 from a provider of a second device 104 in which the MSC 118 includes business logic for translating information obtained from the second device 104 to a format suitable for use by the application 105.

In step 502, the data center information retrieval application 105 populates and/or updates the data store 108 with element records 110 associated with the elements 112 of a first device 104, such as a device natively supported by the application 105. For example, the data center information retrieval application 105 may populate a new data store that has not previously been populated with the element records 110, or if the data store has been previously populated, the data center information retrieval application 105 may update an existing data store with the element records 110 on an ongoing (e.g., periodic) basis such that the parameters and their respective reflect the most recent status of each element 112 of the distributed computing environment 114.

In one embodiment, the data center information retrieval application 105 communicates directly with each element 112 to receive its parametric values. In another embodiment, the data center information retrieval application 105 communicates indirectly with each element 112 using an element manager associated with each element 112 to obtain its parametric values.

In step 504, the data center information retrieval application 105 receives one or more search terms from the user interface 120. If more than one search term are received, it may apply one or more Boolean operators (e.g., OR, AND, ANDNOT, ORNOT, etc.) between each search term.

In step 506, the application 105 searches the data store 108 for any native device element records 110 that match the one or more search terms. That is, the engine 104 compares any entered search terms with the element records 110 and obtains those records that match the search terms.

In step 508, the data center information retrieval application 105 determines whether any search terms involve information to be obtained from a second device 104. In one embodiment, the application 105 may apply a filter to the search terms and direct the request to a particular MSC based upon a type of the search term. For example, when the application 105 encounters a term 'watts', it may interpret this term to mean that a power usage metric is to be obtained and thus direct the term to a MSC associated with a power conversion device 104. If the term indicates that the search is to be applied to a second device, processing continues at step 510; otherwise processing continues at step 516.

At step 510, the application 105 determines which MSC is to be issued with a request. The application 105 may access the inter-element correlation records 124 stored in the data source 108 to identify which second device 104 is to be issued with the request for information. For example, the application 105 may periodically perform a discovery process to identify which elements in the first device are associated with the elements of a second device 104, and store the information as inter-element correlation records in the data source 108. The discovery process may be conducted in any suitable manner to identify the associations. For example, associated elements of a communication link may be identified by reading source/destination IP/TCP addresses of a packet-based link to identify associated elements of the link. As another example, a distributed application may be queried to identify any external storage configurations that may be implemented for its use and store information about the resources of the first device with the elements used to implement the external elements of the second device as inter-element correlation records in the data source 108.

Thereafter, at step 512, the service issues the request to the MSC 118 determined at step 508. When the MSC receives the request, it may translate the request into a form suitable for use by the second device 104, and then transmit the request to the second device 104. When the MSC 118 receives a response to the request, it may then translate the response into a form suitable for use by the application 105, and transmit the response to the application 105. Thereafter, at step 514, the service receives the response from the MSC 118.

At step 516, the service may augment the native device element records 110 with information obtained from the second device if any exist, and display the augmented records on a display for view by the user. In some embodiments, the service may transmit the augmented records to another computer executable process for further processing, such as further augmenting the record, making changes to the configuration of the integrated computing system as a result of the augmented record, or displaying the record on a display managed by the other computer executable process.

In step 518, the data center information retrieval application 105 determines whether another search is to be performed. For example, the data center information retrieval application 105 may receive user input via the 'new search' button 428 on the element display screen 420 that instructs the data center information retrieval application 105 to clear its search term buffer for constructing a new group of element records 110. If the data center information retrieval application 105 receives instructions to perform another search, processing continues at step 504 to receive new search terms from the user. However, if the data center information retrieval application 105 determines that no additional searches are to be performed, processing continues at step 520 in which the process ends.

Although FIG. 5 describes one example of a process that may be performed by the system for augmenting element records 110 with user-defined data 116, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
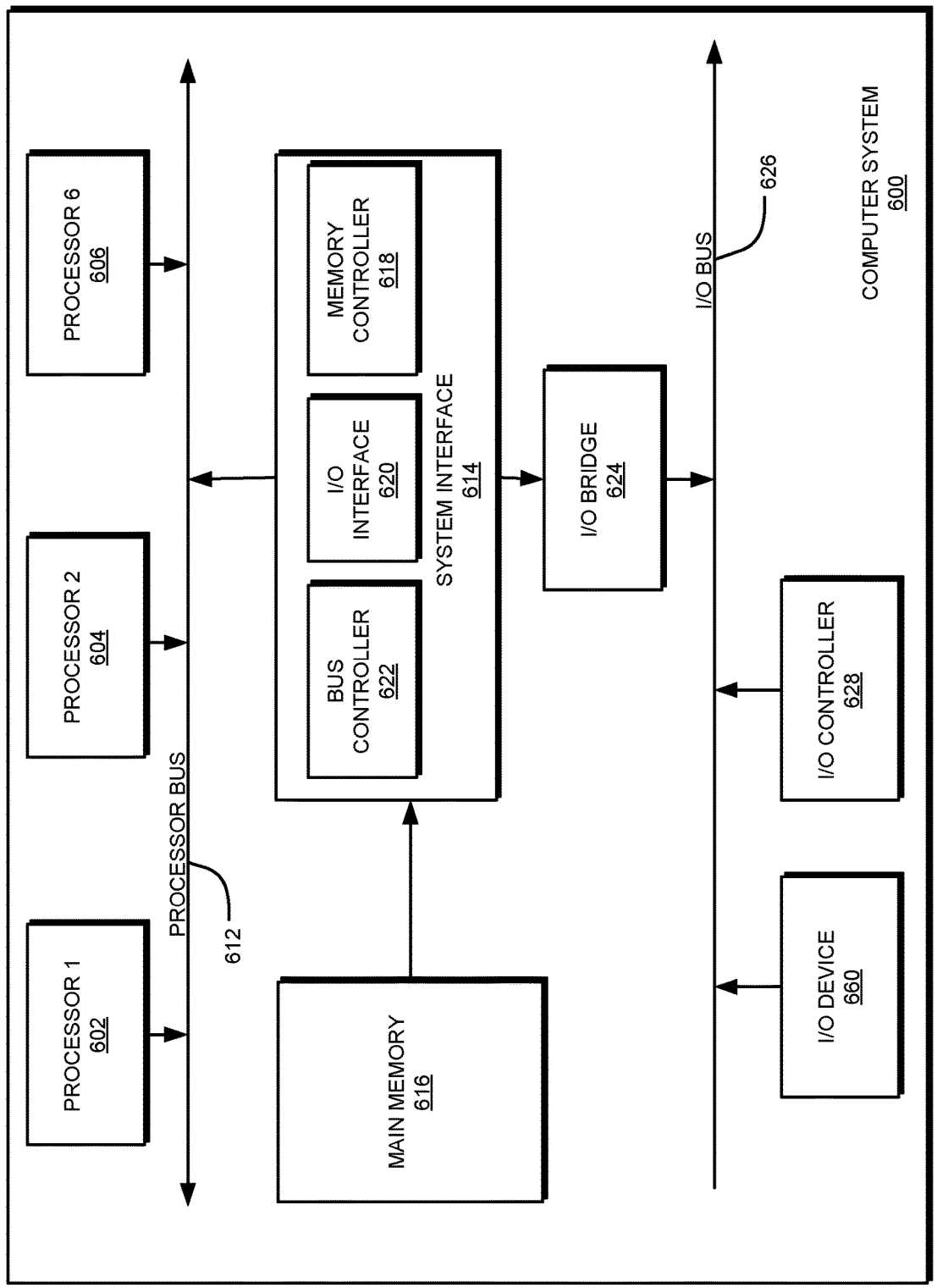
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A data center information retrieval system comprising:
a processing device; and
a non-transitory computer-readable medium encoded with instructions, which when executed by the processing device, cause the processing device to execute an application in communication with a first device and a second device configured in a data center, the first device including one or more first elements that provide a first service for the data center and the second device including one or more second elements with operational dependencies on the one or more first elements, the one or more second elements providing a second service for the data center, the application further executed to:
obtain and store, in a database, one or more first element records comprising operational information of the one or more first elements of the first device, the first element records comprising a first format for storing;
receive, from a provider of the second device, a modular software component configured to modify the application to translate communications to the application and the second device into a second format associated with the one or more second elements;
transmit, to the second device and via the modular software component, an element record request message to obtain operational information associated with the corresponding one or more second elements of the second device, the modular software component translating the element record request message to the second format associated with the one or more second elements; and
amend the first element records with the received operational information of the one or more second elements.

2. The data center information retrieval system of claim 1, wherein the application is further executed to perform at least one of displaying the amended first element records on a display device or transmitting the amended first element records to another computer executable process for further processing.

3. The data center information retrieval system of claim 2, wherein the application is further executed to amend the first element records by identifying a portion of the received information of the one or more second elements that is associated with the first element records, and combining the portion of the received operational information of the one or more second elements with the associated first element records.

4. The data center information retrieval system of claim 2, wherein the application is further executed to store the amended first element records in a non-SQL database.

5. The data center information retrieval system of claim 1, wherein the application is further executed to communicate with the modular software component through an application program interface.

6. The data center information retrieval system of claim 4, wherein the modular software component comprises at least one of a plug-in, an add-in, or an extension coupled to the application.

7. The data center information retrieval system of claim 1, wherein the second device comprises at least one of a telecommunications device, a storage system device, or a power conversion system device.

8. The data center information retrieval system of claim 1, wherein the application is further executed to perform a discovery process to populate the database with the first element records associated with the one or more first elements of the first device.

9. The data center information retrieval system of claim 1, wherein the second device is provided by a manufacturer that is different than a manufacturer of the first device.

10. The data center information retrieval system of claim 1, wherein the first element records are stored in the database as Javascript object notation (JSON) documents.

11. A data center information retrieval method comprising:
   obtaining, using instructions stored in a non-transitory computer-readable medium and executed on at least one hardware processor, and storing in a database one or more first element records comprising operational information of one or more first elements of a first device configured to provide a first service for a data center, the one or more first element records comprising a first format for storing;
   receiving, from a provider of a second device including one or more second elements with operational dependencies on the one or more first elements, the one or more second elements providing a second service for the data center, a modular software component configured to modify the instructions to translate communications to the second device into a second format associated with the one or more second elements;
   transmitting, using the instructions, an element record request message to the second device via the modular software component to obtain operational information associated with the one or more second elements of the second device, the modular software component translating the element record request message to the second format associated with the one or more second elements; and
   amending the first element records with the obtained operational information of the one or more second elements.

12. The data center information retrieval method of claim 11, further comprising at least one of displaying the amended one or more first element records on a display device or transmitting the amended one or more first element records to another computer executable process for further processing.

13. The data center information retrieval method of claim 12, further comprising storing the amended one or more first element records in a non-SQL database.

14. The data center information retrieval method of claim 11, further comprising communicating with the modular software component through an application program interface.

15. The data center information retrieval method of claim 14, wherein the modular software component comprises at least one of a plug-in, an add-in, or an extension of the instructions.

16. The data center information retrieval method of claim 11, wherein the second device comprises at least one of a telecommunications device, a storage system device, or a power conversion system device.

17. The data center information retrieval method of claim 11, further comprising performing a discovery process to populate the database with the one or more first element records associated with the one or more first elements of the first device.

18. A non-transitory computer readable medium storing instructions that, when executed by at least one hardware processor, causes the at least one hardware processor to:
   obtain and store, in a database, one or more first element records comprising operational information of one or more of first elements of a first device configured to provide a first service for a data center, the one or more first element records comprising a first format for storing;
   receive, from a provider of a second device including one or more second elements with operational dependencies on the one or more first elements, the one or more second elements providing a second service for the data center, a modular software component configured to translate communications to the second device into a second format associated with the one or more second elements;
   transmit an element record request message to the second device via the modular software component to obtain operational information associated with the one or more second elements of the second device, the modular software component translating the element record request message to the second format associated with the one or more second elements; and
   amend the first element records with the obtained operational information of the one or more second elements.

19. The non-transitory computer readable medium of claim 18, wherein the instructions further cause the at least one hardware processor to display the amended one or more first element records on a display device.

20. The non-transitory computer readable medium of claim 18, wherein the instructions further cause the at least one hardware processor to communicate with the modular software component through an application program interface, wherein the modular software component comprises at least one of a plug-in, and add-in, or an extension of the instructions.

* * * * *